June 7, 1927.
M. SANDER
1,631,891
SURVEYING INSTRUMENT WITH DRAWING DEVICE
Filed May 7, 1925   3 Sheets-Sheet 2
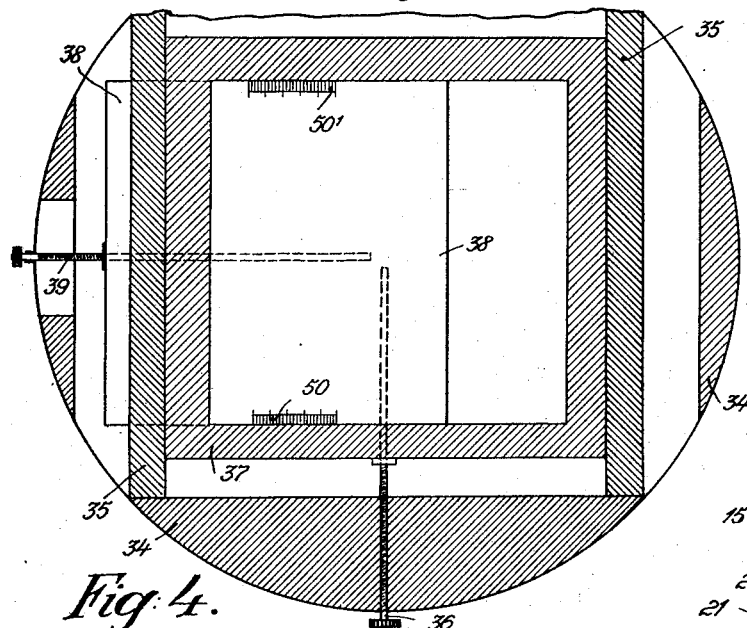
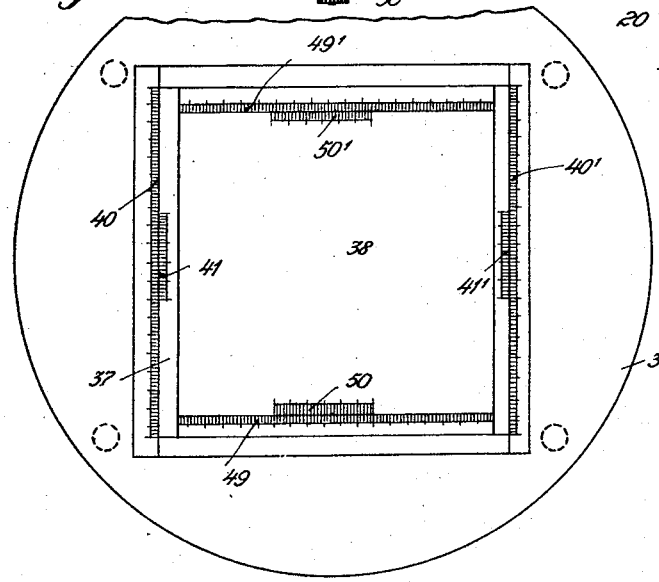
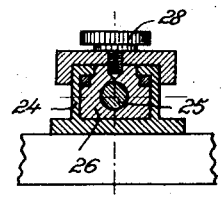
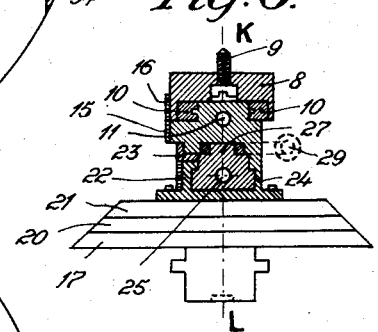
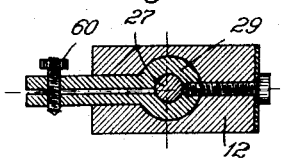
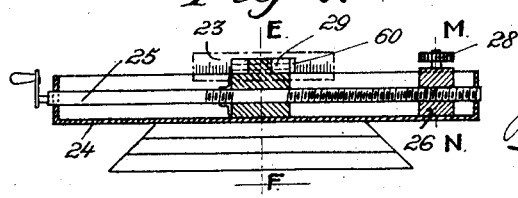

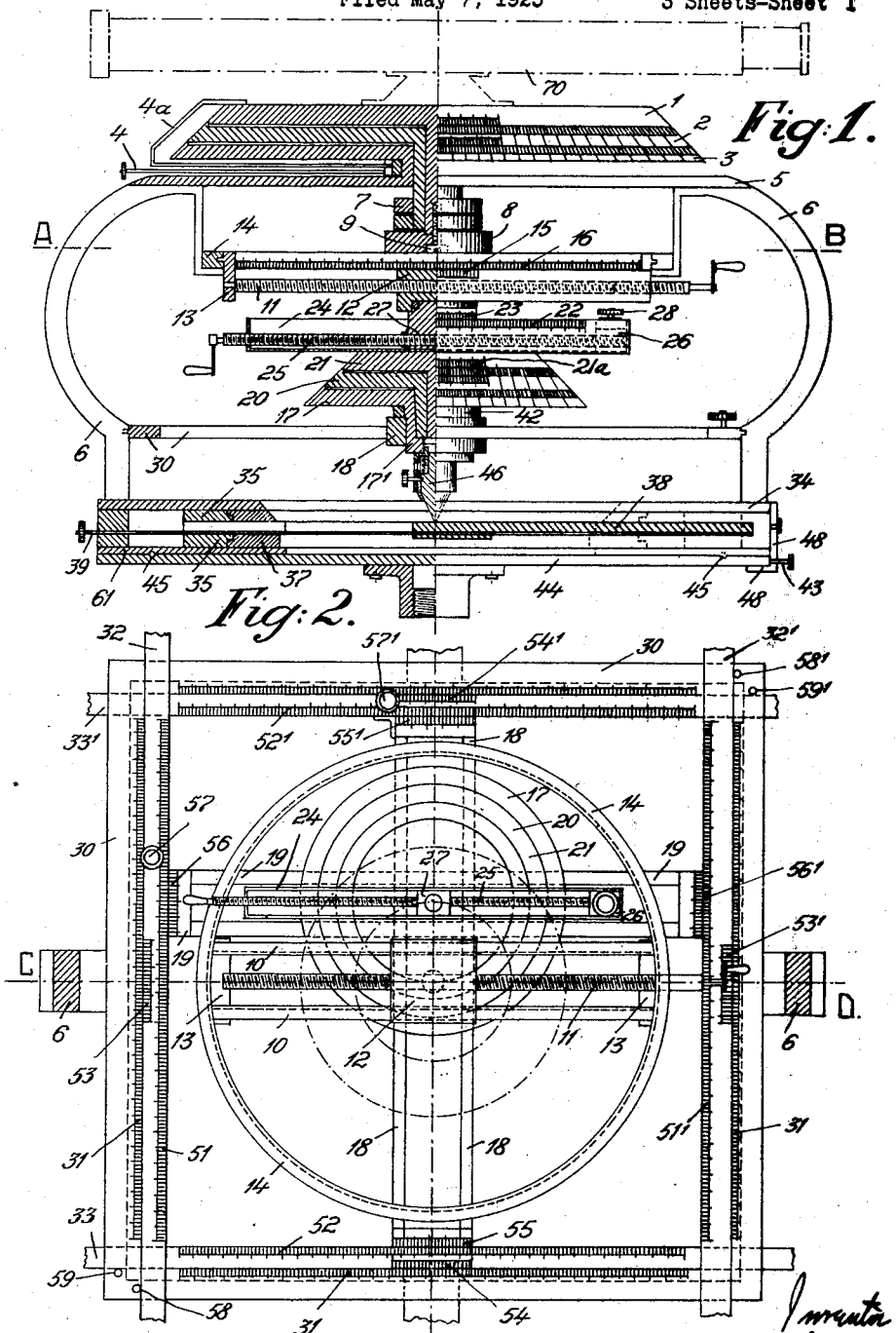

June 7, 1927.　　　　　　　　　　　M. SANDER　　　　　　　　　　　1,631,891
SURVEYING INSTRUMENT WITH DRAWING DEVICE
Filed May 7, 1925　　　　　3 Sheets-Sheet 3
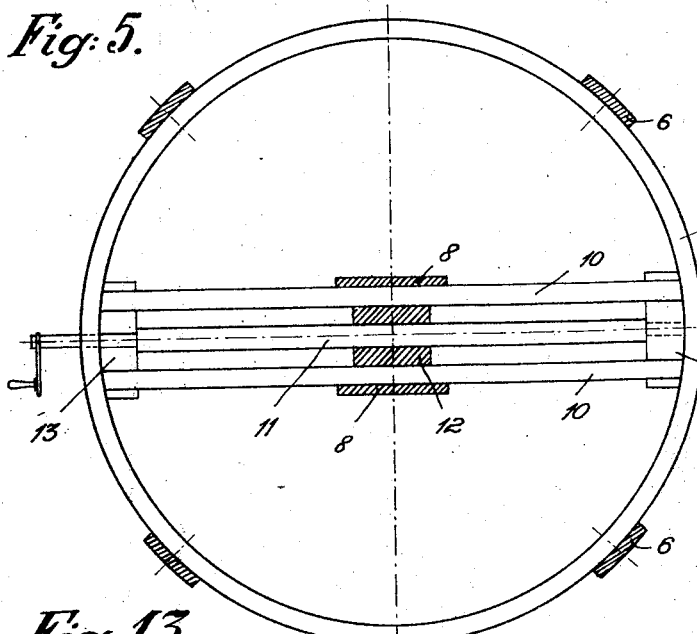
Fig. 5.
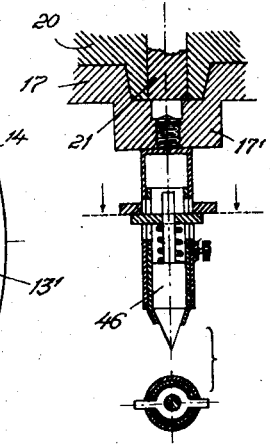
Fig. 11.
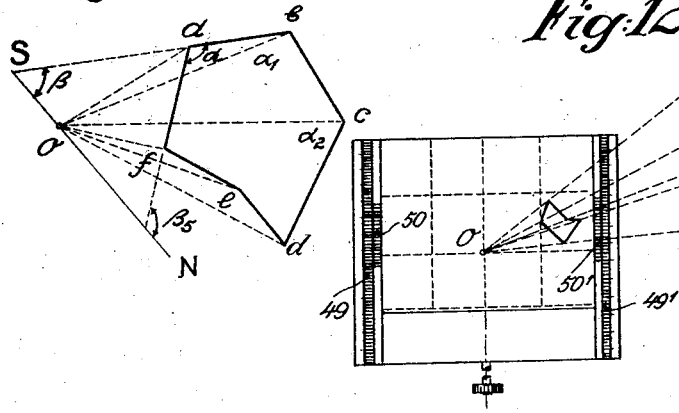
Fig. 13.　　　Fig. 12.
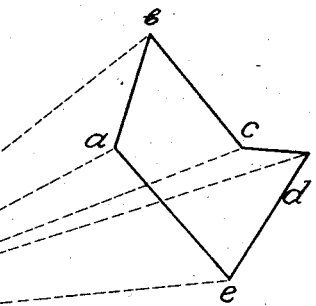
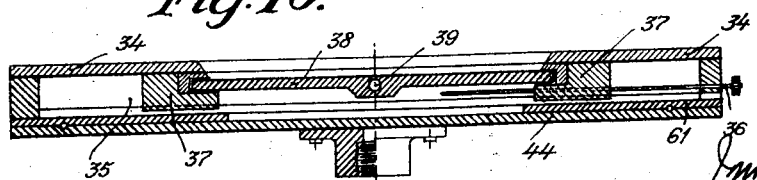
Fig. 10.

Patented June 7, 1927.

1,631,891

UNITED STATES PATENT OFFICE.

MART SANDER, OF HAPSAL, ESTHONIA.

SURVEYING INSTRUMENT WITH DRAWING DEVICE.

Application filed May 7, 1925, Serial No. 28,599½, and in Germany March 31, 1923.

My invention relates to a surveying instrument, on the plotting table of which the distances ascertained during the work are reproduced on a smaller scale.

Surveying instruments are already known, by which the distances obtained by a distance measuring instrument for instance a tachymeter-telescope with or without giving the square-coordinates are reproduced on the plotting table. Also it has already been proposed to combine a movable drawing device with a telescope by means of a horizontal screw so that the screw follows the telescope and that the drawing pencil will follow the distance measuring part, distance being transferred to the scale of drawing.

The object of my invention is to provide an improvement in such instruments to make it possible by means of the same to draw in the connection lines between the points of reference and to record the angles of these connection lines not only to one another but also to a fixed direction for instance to the north-south direction. This is accomplished mainly by introducing a second screw device and a second horizontal segment between the drawing device and the main screw device, which is movable in the line of sight together with the objective, which in turn is provided with a horizontal protractor system.

A further object of my invention is to so improve such a surveying instrument as to enable the right-angle coordinates of the several points of reference to be instantly recorded.

In the accompanying drawings I have selected an illustrative embodiment of my invention as an example of reducing the same to practice:

In said drawings:

Figure 1 is a front elevation of the new instrument partly in cross section on the line C—D Figure 2;

Figure 2 is a plan partly in section of the part situated below the line A—B Figure 1;

Figure 3 is a detail section of the plotting table;

Figure 4 is a detail plan showing the rules for adjusting the plotting table and the verniers appertaining thereto;

Figure 5 is a horizontal cross section through the upper screw device and its bearings;

Figure 6 is a detail sectional view of the connection between the lower segment rule and the upper part of the instrument plane indicated by the line E—F of Figure 7;

Figure 7 is a sectional view on the line K—L Figure 6 through the lower screw device and the lower segment rules;

Figure 8 is a sectional view on the line M—N Figure 7;

Figure 9 is a detail of the connection between both screw devices as seen from below;

Figure 10 is a vertical cross section through the plotting table;

Figure 11 is a detail sectional view of the drawing pencil;

Figure 12 is a schematic view in plan of an example of using the instrument;

Figure 13 is a schematic view in plan of the instrument for surveying.

The instrument (Figure 1) consists of the following parts arranged one above the other: a base plate 44, a bearing 35 for the plotting table 38, a drawing pencil or stylus 46, a device for recording coordinates of the several points of reference, the latter mounted in the frame 30, a lower protractor system 17, 20, 21, one lower and one upper screw device 25 and 11, an upper protractor system 1—3 and a telescope 70 preferably designed as a tachymeter-telescope.

The upper protractor system in the embodiment shown as an example consists of three circular discs 1—3 arranged one over the other. The upper disc 1 is fixedly connected to the telescope and carries a vernier. It is rotatably fixed in the hollow center of the middle disc 2 and the lower end of its center pin is, by means of a screw 9 connected to the part 8 of the upper screw device. The middle and the lower discs 2 and 3 are built as segment rules. The disc 2 is rotatably mounted in a central hole of the disc 3, which in turn is fixedly connected to the part 5 of the frame 6. The disc 3 thus forms the fixed rule. By means of a spanning device 7 the axis of the rotatable rule disc 2 may be fixed to the axis of the disc 1 in such a way that the rule disc 2 follows the movements of the telescope. To the rule disc 1 may be fixed a lever 4ª, by means of which the disc 1 may be exactly adjusted by a micrometer screw (not shown).

The upper screw device 10 to 13 (Figures 1, 2 and 5) is rotatably mounted on the ring 14, which is carried by arms fixed to the frame 6. This screw device consists of two slides 10, a screw 11, carried at its ends by bearings 13, and the nut 12. The nut 12 carries a vernier 15 (Figures 1 and 6) which is movable along a rule 16 fixed on the bearings 13. Fixed on this rule 16 there is a connecting part 8, connected to the rule disc 1 and by means of screws (Figure 6) connected to the slides 10.

The lower screw device (Figure 1) consists of a screw 25, having a free passage through the end walls of a frame-like slide 24 and being movable sideways to the nut 27 (Figures 2 and 6). This nut 27 on its upper part is designed as a pivot which is inserted into the lower part of the screw nut 12 of the upper screw device by means of an intermediary spanning device which may be loosened by the screw 60 (Figure 9). If the screws 60 and 28 are fastened, the nut 27 and thus the whole lower screw device 24, 25 must follow the rotary movement of the rule disc 1 and the upper screw device 10—16. The lower screw 25 is carried in a bearing cube 26 (Figures 7 and 8) which by a screw 28 and a spanner device (Figure 8) may be fixedly spanned in the slide 24. If the screw 28 is fixed the slide 24 moves relatively to the nut 27 when the screw 25 is turned. The nut 27 on its upper part is formed with a pivot and carries a vernier 23, movable with respect to the rule 22 attached to the slide 24.

The slide 24 of the lower screw device is fixedly connected to the upper rotatable rule disc 21 of the lower protractor system 17, 20, 21. The construction of this system consists of the rule discs 17, 20 and 21 and in its main parts corresponds to the upper protractor system 1—3. The rotatable disc 21 is also equipped with a vernier $21^a$. The middle disc 20 forming the rotatable rule may be connected to the upper disc 21 by means of the spanner 42. The fixed rule 17 of the lower protractor system is however mounted in one of the frames 19 of a cross slide device 18, 19 (Figure 2) in such a way, that it may change its place on the plotting table but will not be able to rotate.

These cross slide frames 18 and 19 at their ends carry verniers 55, $55^1$, 56, $56^1$ sliding along the coordinate rulers 32, $32^1$, 33, $33^1$ and adapted to be fixed to them by the spanning device 57, $57^1$. These coordinate rulers by means of verniers 53, $53^1$, 54, $54^1$ and the rule 31 are exactly adjustable to their bearing frame 30 attached to the frame 6, and may be fixed in position by means of spanning devices, screws or the like 58, $58^1$, 59, $59^1$.

On the center $17^1$ is attached the holder of the drawing pencil 46 (Figure 11).

The plotting table 38 (Figures 1, 3, 4 and 10) is mounted in cross slides 35, 37 (Figures 3, 10) and may be adjusted to its circular bed 34 by means of screws 36, 39. For the exact control of its position verniers 41, $41^1$, 50, $50^1$ and rules 40, $40^1$, 49, $49^1$ are provided.

This bed 34 which also carries the frame 6 of the device described is by means of a ball bearing 45 (Figure 1) easily rotatable to the main base plate 44 and may be fixed to latter by spanning device 48, 43.

The main base plate 44, by known means, for instance as shown in Figure 1 by means of screw and nut, is fixed to a tripod or the like.

The surveying with the instrument described is carried out as follows:

The instrument is placed in position at the point O (Figure 13) the coordinates of which are known and from where the area to be surveyed $a$—$b$—$c$—$d$—$e$ (Figure 12) or $a$—$b$—$c$—$d$—$e$—$f$ (Figure 13) may be observed.

After having placed the instrument with its base plate 44 on the tripod and having exactly adjusted it horizontally the rotatable rules 1 and 21 and the rules 2 and 20 as well as the verniers 15 and 23 of the two screw devices are brought to zero, and the coordinate rulers 32, $32^1$, 33, $33^1$ are so adjusted that by means of the verniers 55, $55^1$, 56, $56^1$ the known coordinates of the objective O are read on said coordinate rulers.

Now the whole instrument of the bed plate 34 is turned in that way that the zero point of the non-rotatable rules 3 and 17 of the two protractor systems are pointing exactly to the north.

The spanner screw 43 is screwed home so that the base plate 44 can not move.

The spanning devices 7 and 42 will then be fixed, thus connecting the middle and the lower discs of the disc rule devices.

The drawing paper is then fitted to the plotting table 38 which will then by means of the vernier 50 and the rule 49 (Figure 4) be adjusted in the direction of ordinates and by means of the rule 40 mounted on bed plate 34 and the vernier 41 mounted on the edge of the frame 37 in the direction of Abzises in that way that the point where the drawing pencil 46 touches the drawing paper—both screw devices being adjusted to zero—exactly corresponds to the known coordinates of the erecting point O (Figure 13) of the instrument.

If the area shown in Figure 11 by points of reference $a$—$b$—$c$—$d$—$e$—$f$ is to be surveyed, the telescope and with it the rule disc 1 and the slides 10 are directed against the point of reference $a$. Because the disc 2 is hereby connected with the disc 1 it is possible on the fixed rule 3 to now read the angle the line O—$a$ makes to the north-south direction. Then the distance of point $a$ from the point O is ascertained for instance by using the tachymeter threads of the telescope in connection with a spaced stadia rod placed at point $a$, and, by the screw 11, the nut 12 is moved until the distance O—$a$ is exactly given on the rule 16 and the vernier 15. If so described the line O—$a$ by said movement may be drawn in upon the drawing table 38, by previously loosening the spanning screws 57, 57¹ of the coordinate recording device (Figure 2) by fastening the spanning screws 28 and 60 (Figure 7) of the lower slide device and by turning the screw 25 until zero of the rule 22 comes opposite to zero of the vernier 23.

The central axis of the lower protractor system 17, 20, 21 now stands exactly above the point on the drawing paper chosen corresponding to the point of reference $a$.

At this movement the frames 18 and 19 (Figure 2) of the coordinate recording device are also moved so, that by means of the verniers 55 and 56 it is possible on the rules 51, 52 of the coordinate rulers 32, 33 to read the coordinates of the point $a$. The screws 57, 57¹ are now fastened and the screws 28 and 60 are loosened. The zero point of the revolving rule still corresponds to the zero point of the vernier on rule 21 because the rule 20 is fastened by screw 42. If then the telescope is directed toward the point of reference $b$ and the measured distance of this point from the instrument O by the screw 11 and the vernier 15 is registered on the rule 16, the lower protractor system 17, 20, 21 and the drawing pencil 46 remain unaltered because the lower nut 27 is not influenced by the revolving of the nut 12 and the drawing pencil 46 is kept in position by the cross slide device 18, 19.

The slide 24 is now adjusted to that direction in which the points $a$ and $b$ are situated. The slide 24 not being fixed to the bearing cube 26 it will be automatically moved relative to the vernier 23 such a distance as to correspond in the scale of drawing with the distance $a$—$b$, it being thus possible to make a reading of this distance. The revolving rule 2 of the upper protractor system not having followed the movement of the rule disc 1 the angle $a$—O—$b$ may be read. By turning the rule 2 with the vernier of the rule 1 to zero the angle between the direction O—$b$ and the north-south direction may be read.

Now the screws 28 and 60 are fastened and the screws 57 and 57¹ are loosened. By adjusting the slide 24 to zero by means of the screw 25 and the vernier 23 the axis of rotation of the lower protractor disc system and the drawing pencil 46 will be moved to a point on the drawing table, which corresponds to the point of reference $b$ in the area to be surveyed, the coordinates of which may now be read on the rules 51, 51¹, 52, 52¹ and the line $a$—$b$ will be drawn on the drawing paper. The angle $\beta$ of the line $a$—$b$ to the north-south direction (Figure 13) may now be read on the disc rule 17 as compared with disc rule 21 of the lower protractor system.

For drawing in further points of reference $c$, $d$, $e$, $f$ the manipulation is correspondingly repeated. When directing the instrument on the objective the connection between the rule discs 20 and 21 is loosened, so as to give the angles $\alpha^1$, $\alpha^2$ etc., which the connecting lines between the points form with one-another on the rules 20 and 21, and after turning the revolving rule 20 back to zero of the rule 21 to give the angles $\beta^1$, $\beta^2$ etc. (of which in Figure 13 only $\beta^5$ is shown), which these connecting lines form to the north-south direction.

I claim:

1. A surveying instrument comprising a base, an upper protractor system comprising a lower member 3 fixedly mounted on said base, an intermediate member 2 revoluble on said lower member and an upper member 1 revoluble on said intermediate member and arranged to carry a telescope, means 4 to secure member 2 to the member 1 to cause said member 2 to turn with member 1 and also with the telescope; a fixed ring 14 mounted on the base below the upper protractor system, a frame 10, 13 mounted to turn in the ring, a screw 11 mounted for rotation in the frame, a traveling nut 12 engaged by said screw and having a vernier coacting with a rule with which said frame is provided, a connecting element 8 slidable on said frame and to which the center of the upper protractor member 1 is pivotally connected (9); a bed 34 revoluble on the base and provided with rulers 40, 40¹, 49, 49¹ arranged at right angles to one another, a plotting table 38 mounted for lateral movement on the bed in either of two directions at right angles to each other and provided with verniers to coact with said rulers, means 36, 39 to adjust the plotting table; a rectangular angular bearing frame 30 mounted on the base (58¹, 59¹) cross slides 18, 19 at right angles to each other mounted for movement on the bearing frame 30 and provided with verniers 55, 55¹, 56, 56¹; coordinate rulers 32, 32¹, 33, 33¹ on which said verniers are slidable, said rulers being adjustable on the bearing frame and being provided with means whereby they may be secured when adjusted; a lower protractor system comprising a lower member 17 provided at the center with a stylus and mounted against rotation and for movement in said cross slides to correspondingly move the stylus on the plotting table, an intermediate member 20 mounted for movement on said lower member, and an upper member 21 mounted for rotation on said intermediate member; a slide 24 fixed to and extending across the center of said upper member, a screw 25 arranged longitudinally in and disengaged from said slide, a nut 27 movable longitudinally in said slide, engaged by said screw and pivotally connected to the aforesaid traveling nut 12, means to lock said traveling nut and said nut 27 together, a second nut 26 movable in said slide and engaged by said screw, and means to secure said second nut to said slide to enable said nut 27 to be adjusted longitudinally of the slide by said screw 25.

2. A surveying instrument comprising a base, a plotting table mounted for movement on the base in any direction in a horizontal plane, an upper protractor system including a fixed member, a telescope carrying member and an intermediate member, said last two members being revoluble, a lower protractor system including a lower member provided with a stylus to operate on the plotting table and revoluble upper and intermediate members, mounting means for said lower member of the lower protractor system enabling said protractor system to be moved in a horizontal plane in either of two directions at right angles to each other, means connecting said upper and lower protractor systems for independent operation and means coacting with a member of said connecting means to shift the lower protractor system laterally with respect to the upper protractor system and means to determine the position of said lower protractor system.

MART SANDER.